D. S. CRISWELL.
STANDING VALVE.
APPLICATION FILED APR. 24, 1911.

1,015,142. Patented Jan. 16, 1912.

WITNESSES
INVENTOR
D. S. Criswell
Attorney

UNITED STATES PATENT OFFICE.

DAVID S. CRISWELL, OF PROSPECT, PENNSYLVANIA.

STANDING VALVE.

1,015,142.  Specification of Letters Patent.  Patented Jan. 16, 1912.

Application filed April 24, 1911. Serial No. 623,077.

*To all whom it may concern:*

Be it known that I, DAVID S. CRISWELL, a citizen of the United States, residing at Prospect, county of Butler, State of Pennsylvania, have invented certain new and useful Improvements in Standing Valves, of which the following is a specification, reference being had therein to the accompanying drawing.

This invention relates to certain new and useful improvements in standing valves for oil wells, the main object being to provide a valve which is so constructed that the well will be automatically flooded to cause an agitation of the oil within the well for the purpose of freeing the walls of the well from paraffin or other substance which collects thereon and fills up the crevices and pores of the oil producing rock, whereby the flow of the oil will be greatly increased.

Another object of the invention is to provide a valve in which the valve proper is provided with an interrupted periphery so as to cause an imperfect seat which allows the volume of oil within the tubing above the valve to flow back into the well with a tremendous force which agitates the same and also carries back all foreign particles accumulated within the valve casing.

A further object of the invention is to provide a valve in which the same is so constructed that an imperfect seat will be accomplished on an average of once in every ten times the working valve is reciprocated.

Other and further objects and advantages of the invention will be hereinafter set forth and the novel features thereof defined in the appended claims.

Figure 1:
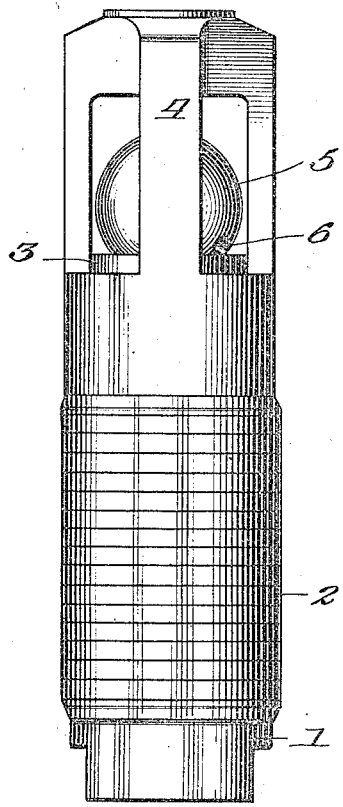
Figure 2:
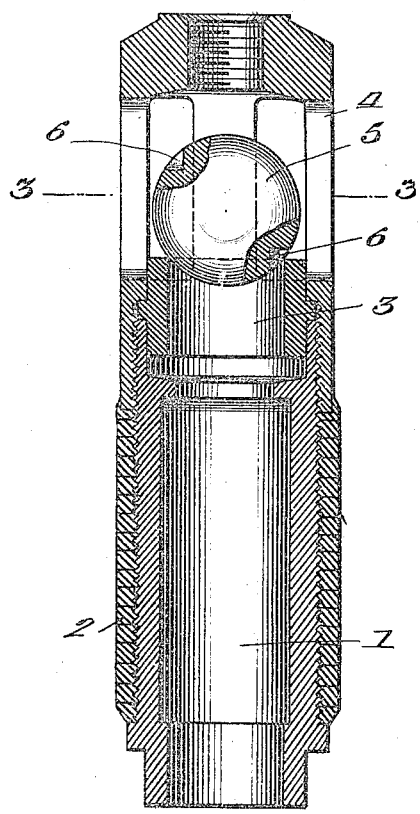
Figure 3:
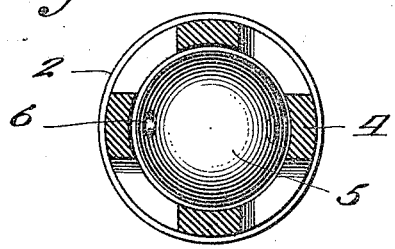
Figure 4:
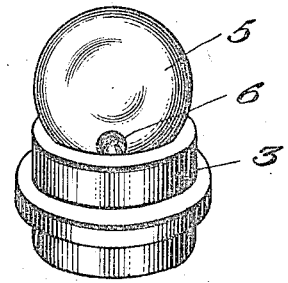

In the drawing—Figure 1 is a side elevation of my improved valve; Fig. 2 is a vertical section through the same; Fig. 3 is a section taken on line 3—3 of Fig. 2; and Fig. 4 is a perspective view of the valve and valve seat detached.

Like numerals of reference refer to like parts in the several figures of the drawing.

In the drawing, 1 indicates a casing of an ordinary construction of standing valve which is provided with the usual packing leather 2 and detachable valve seat 3 which is held in position within the casing 1 by a cage 4 which is threaded thereon as clearly shown, the above description being given so as to explain the operation of my improved ball valve, when arranged within a standing valve. It is, of course, understood that various other forms of valve casing may be used in connection with the ball valve as will be later described.

In deep well pumping, it has been found that the walls of the strata of the oil bearing rock soon become coated with paraffin which reduces the flow of oil and the main object of my invention is to provide a valve which will automatically flood the walls of the oil bearing rock in order to loosen the paraffin and open the pores to increase the flow of oil.

In the form shown, I provide a ball valve 5 with oppositely disposed recesses 6 so as to form an interrupted periphery and it is, of course, understood that the number of recesses can be varied or the shape of the ball slightly changed so as to cause the same to form an imperfect seat when arranged in the valve seat in a certain manner, and by experiment, I have found that a ball valve in a standing valve rotates as it is seated and unseated by the pressure of the oil which will cause the recess to assume the position as shown in Figs. 2 and 4 about every tenth time the ball is unseated. When the ball assumes a position so as to form an imperfect seat, the volume of oil which has been drawn within the tubing by the working valve is allowed to pass through the valve casing 1 with great force which sprays against the walls of the well.

From the foregoing description, it will be seen that I have provided a valve which is automatic in operation and will keep the walls of the well free from paraffin or other clogging substance as well as to maintain the valve in a clean condition.

While I have shown and described my valve used as a standing valve, it is, of course, understood that the same may be used for other purposes where a check valve is desired.

Having described my invention and set forth its merits what I claim and desire to secure by Letters Patent is—

1. A standing valve for oil wells having a ball valve provided with oppositely disposed recesses capable of forming an imperfect closure.

2. A device for flooding and agitating an oil well comprising a valve casing having a ball valve mounted therein having recesses formed in its periphery capable of forming an imperfect closure.

In testimony whereof I affix my signature in presence of two witnesses.

DAVID S. CRISWELL.

Witnesses:
A. L. FINDLEY,
E. L. GOUCHER.